United States Patent [19]

Echols et al.

[11] 4,064,619
[45] Dec. 27, 1977

[54] METHOD OF JOINING PLASTIC COATED PIPE

[75] Inventors: Marvin C. Echols; David L. Gruller, both of Houston, Tex.

[73] Assignee: Zap-Lok Systems International, Inc., Houston, Tex.

[21] Appl. No.: 747,409

[22] Filed: Dec. 3, 1976

[51] Int. Cl.² .......................... B23P 3/00; B23P 25/00
[52] U.S. Cl. ...................................... 29/458; 29/525; 285/55; 285/374
[58] Field of Search .................... 29/458, 525; 285/55, 285/374

[56] References Cited
U.S. PATENT DOCUMENTS

| | | | |
|---|---|---|---|
| 2,273,154 | 2/1942 | Stromsoe | 29/458 UX |
| 2,398,788 | 4/1946 | Hedrick | 29/458 UX |
| 2,741,498 | 4/1956 | Elliott | 29/525 X |
| 3,210,102 | 10/1965 | Joslin | 285/374 |
| 3,343,252 | 9/1967 | Reesor | 29/458 |
| 3,466,738 | 9/1969 | Mount | 29/525 |
| 3,476,413 | 11/1969 | Coberly et al. | 29/525 UX |

Primary Examiner—Charlie T. Moon

[57] ABSTRACT

Mechanical pipe joints of the pin and bell variety, and methods of forming same, wherein the ends are preformed so as to permit a controlled interference fit upon joining and preferably provide a double seal against both internal and external pressure, the joints being particularly adapted for field-grade materials, aluminum members, and internally and externally coated members and being readily disengagable and re-formable without producing galling.

6 Claims, 6 Drawing Figures

U.S. Patent   Dec. 27, 1977   Sheet 1 of 2   4,064,619
FIG.1
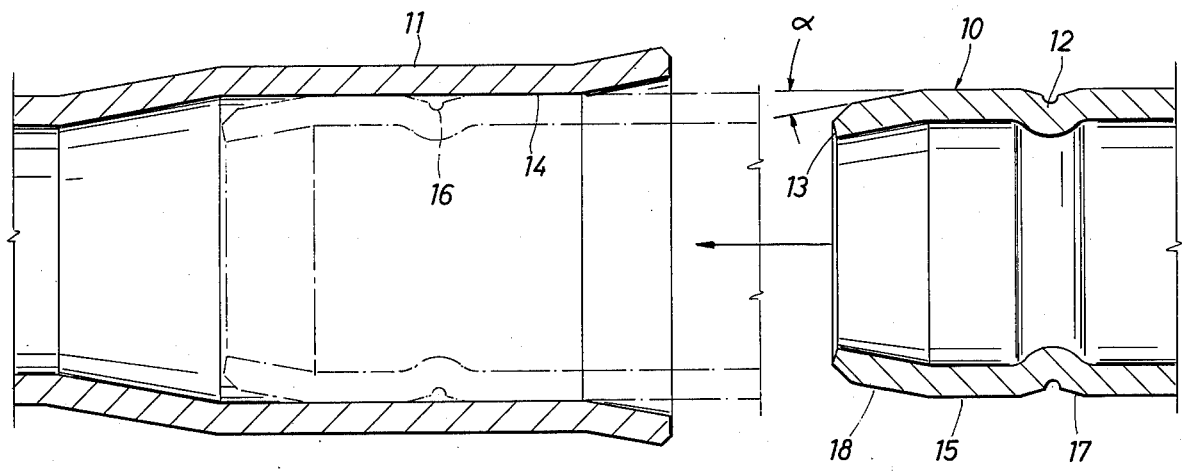
FIG.2
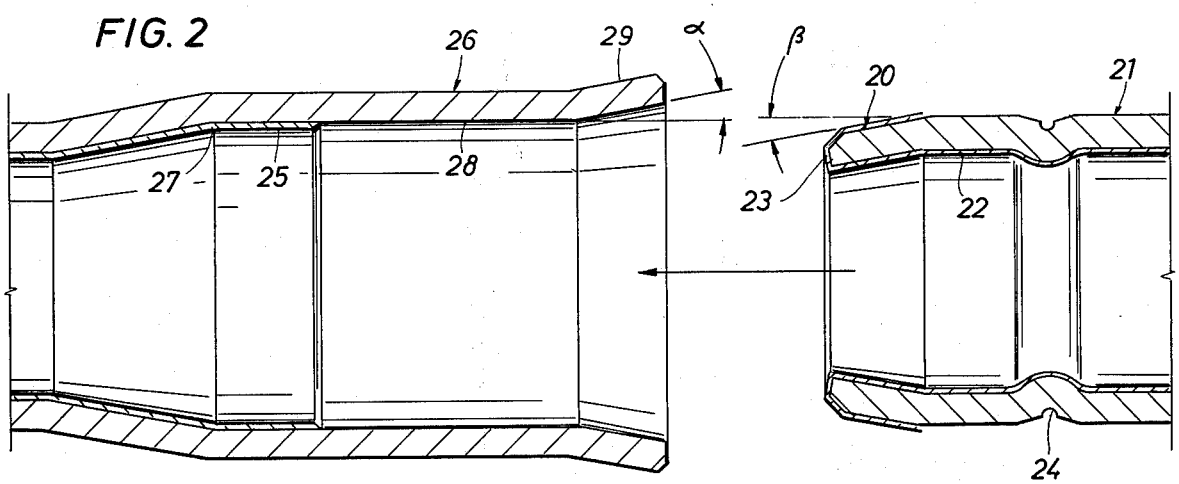
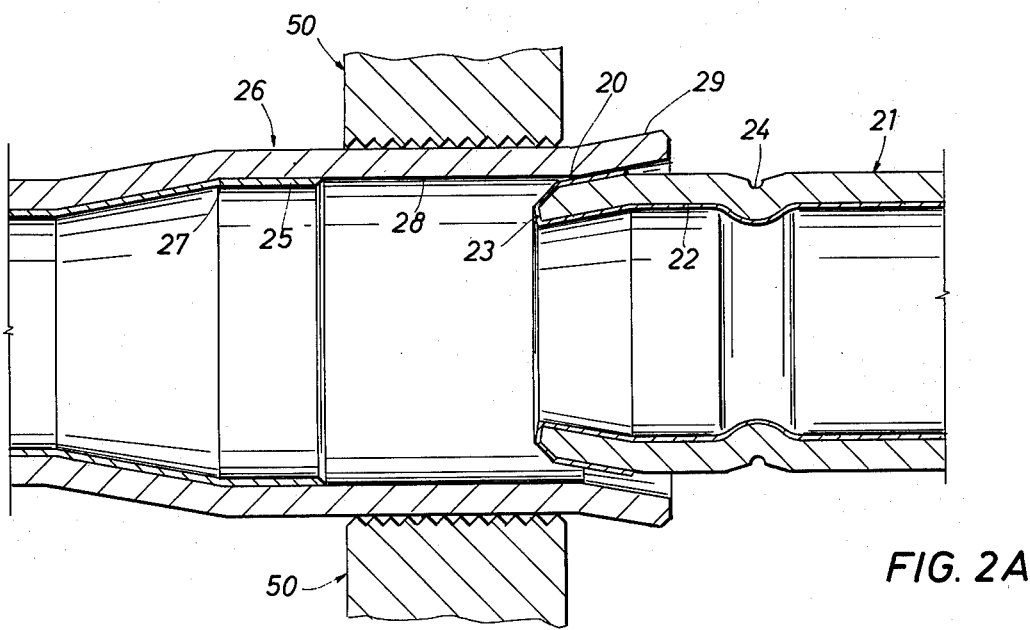
FIG. 2A U.S. Patent   Dec. 27, 1977   Sheet 2 of 2   4,064,619

METHOD OF JOINING PLASTIC COATED PIPE

BACKGROUND OF THE INVENTION

1. Field of the Invention

The present invention relates to methods of forming mechanical joints between lengths of field-grade pipe of the type and quality typically utilized in oil field applications, such as gathering lines for distribution systems down-hole casing, and the like, and to the joints so formed. It is particularly adapted for joining materials heretofore considered highly difficult if not impossible to join mechanically with consistent reliability, namely, plain aluminum pipe, internally-coated pipe, and externally-coated pipe.

2. Description of the Prior Art

The literature contains many schemes for mechanically joining pipes, tubing and the like, only a few of which have proved actually capable of forming leak-free joints with oilfield materials. One such method known to be actually operative is that disclosed in U.S. Pat. No. 3,208,136. Such patent discloses a pipe-joining method consisting essentially of forming a bell on one pipe end, rolling an annular groove in another pipe end, and telescoping the latter into the former. Additionally, one or the other of the two surfaces was typically coated with a liquid lubricant-sealant prior to the joining of the pipes. Related U.S. Pat. No. 3,210,102 discloses the coupling or joint essentially formed by the above-described method.

U.S. Pat. No. 3,466,738 discloses a method of joining pipe consisting essentially of simply forcing together two pipe ends of like diameter, the only preparatory step being the slight flaring of one tip in order to permit the initial entry of the other. The amount of force and the time required to so join two such pipe ends is many times greater than that required by the method of the present invention, and it is likely that galling of the parts can occur.

Enclosed British patent specification No. 435,700 discloses a tubular joining method which is in some respects similar to both that of U.S. Pat. No. 3,466,738 and that of the present invention. FIG. 3 of said specification discloses a slight bell at the mouth of the outer member whereas FIG. 1 discloses a chamfer on the outside edge of the inner member. The two members are to be forced together without the application of heat and in such a manner as to stress at least one member beyond its elastic limit. The compound elastic-plastic strain is achieved by dimensioning the members prior to joining such that the inner diameter of the outside member is only slightly smaller than the outside diameter of the inner member. The provisional portion of said Specification discloses the desirability of, alternatively, forming the portions to be joined as opposed cones or one or both such portions having annular grooves and-/or corresponding steps. No drawing of such alternative construction is provided, but it appears that the construction alluded to is of the "snap-in" or "locking" variety. It is noted that all joints illustrated are of cross-sectional area considerably reduced from that of at least one of the tubular members.

U.S. Pat. No. 3,217,400 discloses a method of connecting thermoplastic pipe sections and the like in which such sections containing similar annular bulges are hammered together until the bulge of the inner section engages the inner side of the bulge of the outer section. U.S. Pat. No. 3,828,412 discloses the joining of tapered, thin aluminum tubes, of the type typically used in the refrigeration field, by coating one member with epoxy prior to insertion and subsequently curing said epoxy to form a purely adhesive lap joint. U.S. Pat. No. 3,785,025 discloses a method of constructing a hermetic compressor discharge tube joint wherein a male member having two cylindrical seals is partially inserted into the other member, liquid adhesive is poured into the annular well therebetween, insertion is then completed and the adhesive permitted to cure to form a seal gasket. None of these methods is, however, applicable to the joining of elements such as pipe, casing, and the like, and none of the known methods of others is believed operable when applied to such field-grade elements.

SUMMARY OF THE INVENTION

The present invention is directed to the formation of high integrity, reliable mechanical joints of the pin and bell variety. Although applicable to tubular elements of precision manufacture and/or finishing, it is particularly applicable to tubular goods such as field-grade pipe, down-hole casing, and the like which are subject to variation in dimensions and quality. It is also particularly well suited for joining tubular goods heretofore considered highly difficult if not impossible to join mechanically with consistent reliability, namely, aluminum pipe, internally-coated pipe, externally-coated pipe, and pipe which has been coated both internally and externally. Additionally, it is well suited for forming joints from elements coated with brittle material, and it permits the joining of externally-coated pipe without a subsequent "field joint."

The invention involves pre-forming the ends of the "minimum interference fit" upon joining. One end is expanded, both elastically and inelastically, into a bell-shaped configuration which has, after "snap-back" from expansion, a minimum interference dimension with respect to a pin having the maximum A.P.I. allowable deviations. An annular groove of desired configuration is preferably formed on the pin end as a reservoir for a sealant which provides a secondary seal. The pin end is preferably coated with a lubricant-sealant for perfection of the joining process. The leading portion of the end of pin is mechanically worked to a tapered configuration such that the bearing pressure between the pin and bed, upon engagement of the pin with the bell is always insufficient to producing galling. The portion of the pin beyond the leading portion preferably is not worked because the bell is sized to accommodate the maximum expected variation in dimension of this portion. In certain other aspects of the present invention the location of interior and exterior coating is controlled. The joining of coated pipe ends uses slips to control the expansion of the pipe end.

Alternate embodiments of the invention, as well as the preferred form of the invention itself, will be more fully understood by reference to the description below.

BRIEF DESCRIPTION OF THE DRAWINGS

FIG. 1 is an enlarged sectional view of bell and pin ends formed for joining plain or uncoated pipe, the dotted portion of which illustrates the position of the pin end after formation of the joint.

FIG. 2 is a similarly enlarged sectional view of bell and pin ends formed for joining coated pipe, and illustrates a preferred arrangement for internal coating.

FIG. 2a illustrates the protection afforded the coating material during initial contact by a misaligned pin member whereas

DESCRIPTION OF THE PREFERRED EMBODIMENTS

Figure 2B:
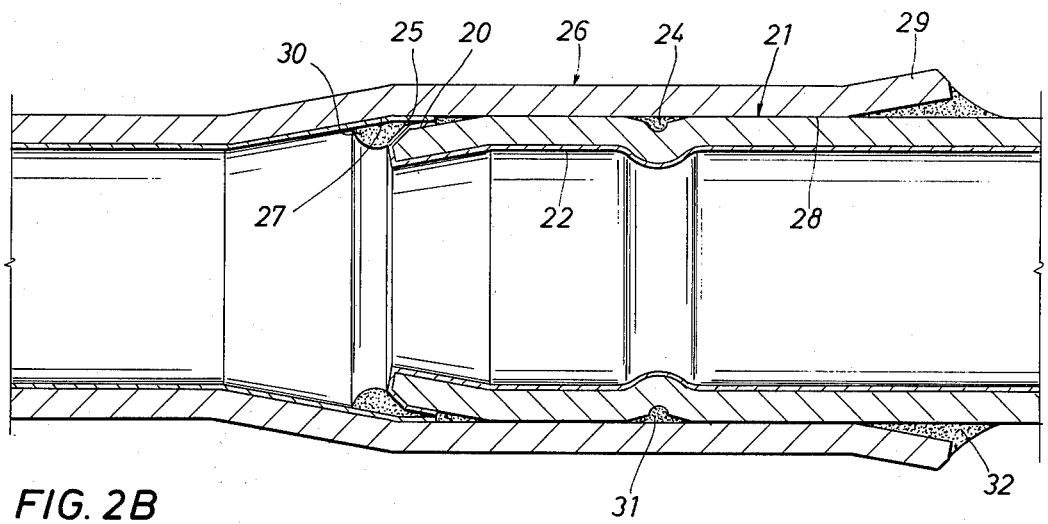
FIG. 2b illustrates the completed joint with the resultant deposits of sealant.

A preferred embodiment for joining plain, uncoated tubular elements, whether of "hard" material such as steel or of "soft" material such as aluminum, is illustrated in FIG. 1. In FIG. 1, the pin 10 is forced into the open end of the bell 11 to form a joint as illustrated by the pin outlined in dashed line in FIG. 1. The method employed to create the joint illustrated can best be understood by a step-by-step explanation for a given size tubular element. In the case of American Pipe Institute "Schedule 40" steel pipe of nominal 4½-inch outside diameter (O.D.), the nominal wall thickness is 0.237 inch, resulting in a nominal inside diameter (I.D.) of 4.026 inches. It is an object of the present invention to obtain the "minimum interference fit" necessary to provide a strong joint while allowing for the maximum dimensional variation permitted by A.P.I. standards. Maximum gripping force between bell and pin, for most materials, is typically obtained at internal stresses near the elastic limit; any amount of interference greater than that which produces a practical maximum of gripping strength is not only unnecessary but actually undesirable. Such excess interference is unnecessary in that it produces little or no increase in gripping force, and is undesirable in that it both requires greater force for the subsequent joining operation and can produce galling between the material being joined. The term "galling" as used herein refers to the effect of gouging a groove along the length of the pipe ends. The effect of "galling" is to permit leaks to occur when pressure is applied.

In accord with the present invention, a satisfactory "minimum interference fit" has been determined to be approximately 0.005 inch per inch of outside diameter. For a nominal 4.5-inch diameter pipe, then, the minimum desired interference is 0.0225 inch. A.P.I. standards on such pipe allow ±0.75% variation. A 4.5-inch diameter pipe with A.P.I. standards may thus be encountered with outside diameter as small as 4.46625 inches (4.50-[0.0075 × 4.50]). Thus, to allow for the minimum desired interference of 0.0225 inch, the bell must be expanded such that its maximum I.D. after "snap-back" is approximately 4.44 inches (4.46625-0.0225). Such sizing to obtain a "minimum interference fit" has been found to satisfactorily accommodate pin ends of pipe with the maximum positive A.P.I. variation without significantly increasing the force required for joining and while maintaining an adequate gripping force.

The relationship described above may be expressed in restated form as follows:

Max I.D. Bell = Min O.D. pin − 0.005X where Max I.D. bell = "Snap-back" dimension in inches Min O. D. pin = Smallest pin O.D. in inches X = Nominal Pin O.D. in inches The foregoing is usually sufficient to permit leak-free, strong joints to be formed between precision-made or precision-formed elements, but such high quality workpieces are not ordinarily encountered in actual practice. Also, joints which are only "usually" leak-free are unacceptable in the pipeline industry, the needs of which demand a leak-free joining rate of virtually 100%. To consistently achieve the high degree of reliability with tubular elements of typical oilfield quality, it has proved desirable to perform a preliminary forming operation on the pin 10. This is preferably accomplished by forming an annular groove 12 in the end of the pin 10, preferably as near the terminal end 13 of said pin 10 as conveniently obtainable. By applying a conventional lubricating selant to either the inner surface 14 of the bell 11 or to the outer surface 15 of the pin 10, the region about the groove 12 will serve as a reservoir for sealant and a secondary seal 16 after make-up of the joint. The sealant in the groove 12 does not significantly contribute to the mechanical strength of the joint but does interdict any longitudinal interstitial voids which might otherwise, either singly or in combination, permit the joint to leak. Liberal application of the lubricating sealant will insure the filling of any macroscopic localized voids, such as between a localized flat spot on the pin end and the surrounding bell; the lubricating properties of the sealant will reduce the resistance to joining, all as disclosed in U.S. Pat. No. 3,208,136.

In a preferred embodiment, the aforementioned groove 12 is either formed with a beveled annular relief portion 17 adjacent the sides of the groove. Dependent upon the quality of the tubular goods to be joined it may be desirable to take the edge off the outside diameter of the pin. This can be done by mechanically working as by rolling, the extreme edge or lip 18 of the pin in order to remove any upset of material which otherwise could initiate deleterious galling in the bell. At the same time it is usually desirable to work at least part of the leading portion 18 of pin 10 such that said portion has a conical shape defined by an angle and relative to the outer surface of the pin. It has been found that, for "hard" materials such as steel, a nominal declination or angle of 4° is sufficient to reduce the bearing pressure upon insertion below that pressure which ordinarily produces galling.

Although alternate means are readily apparent to those skilled in the art, all of the forming operations on the pin end may be advantageously carried out in essentially one operation. U.S. Pat. No. 3,473,359 discloses a grooving device having three rollers spaced roughly circumferentially equidistant; such a grooving device may be readily adapted for performing all of the foregoing pin forming operations by replacing two of said rollers with "nose" and "finishing" rollers. The nose roller is preferably spaced longitudinally from the grooving roller and is adapted (1) to remove any upset of material which may be present at the extreme edge or outer lip 13 of the pin and/or (2) to mechanically work, if desired, at least part of the leading portion 18 of pin such that said portion 18 is turned down the desired small angle $\alpha$. The finishing roller is adapted to turn down any ridges which may be present adjacent the groove. Additionally, the described roll-forming operation reduces the eccentricity or "out-of-roundness" of the pin end, and does so with no possibility of galling the pin as may occur with other forming procedures such as swaging.

The desired pre-forming operations may be carried out most advantageously in a steel mill, pipe yard, or other locale prior to distribution of the material to the job site. In actual field tests of pipe to be joined to form a pipeline, several sections of pre-formed pipe were pre-distributed at various points along the pipeline right-of-way. An improved device of the general type as shown and described in U.S. Pat. No. 3,503,244 was set up at one such point and the pipe was then, seriatim, swabbed with lubricating sealant, stabbed, made-up, and pulled through the joining device by a tractor. In this manner, an inexperienced crew of only three, including the tractor operator, was able to achieve a "production" joining rate of one 40 foot joint per 60 seconds.

Heretofore it has been considered highly difficult if not impossible to mechanically join aluminum pipe with consistent reliability and economy. Aluminum has heretofore presented special difficulties because of certain of its unusual characteristics, two of which are (1) the extremely low bearing pressure at which a cold pressure-weld occurs, and (2) the extremely high coefficient of friction between two smooth aluminum parts. Depending upon the quality of the workpieces, the present invention as described above overcomes these difficulties and satisfactorily accomplishes the objects of the present invention. To insure reliable joints to the degree required in the pipeline industry it is preferred to use a high-film-strength lubricant-sealant in the formation of the joint as above described.

The preferred embodiment of the present invention for joining pipe or other tubular goods which are internally coated may be best understood by reference to FIG. 2, 2A and 2B. For this application, it is preferred to turn down or taper the leading portion or nose 20 of the pin 21 to typical values of a declination angle on the order of 10° with respect to the wall surface of the pin. As will be seen, the present invention permits a complete overlapping of the internal coating of a pin and bell while simultaneously permitting greater tolerance on the joint makeup length or insertion depth.

In the preferred embodiment illustrated, the internal coating 22 of the pin 21 does not terminate at edge 23 but continues around the end of the pipe and up the outside of the turned down portion 20 of the pin, up to a point near but short of outer diameter of the pin. The internal coating 25 of the bell end 26 preferably extends a convenient distance past the junction of expansion should 27 and the expanded straight porton 28 of bell 26, but need not extend to the outer flare 29 at the end of the bell. The inclination angle γ of flare 29 or outwardly extending taper may be any convenient small angle of lesser magnitude than the declination angle B of taper on the end of pin 21. Satisfactory results have been obtained with inclination and declination angles of 4' and 10°, respectively. As shown in FIG. 2A, such an angular difference has been found adequate to protect the coating on the outer part 20 of the pin from contacting the inside surface of the flare 29 during the "stabbing" position of the joining procedure, even though the members prior to stabbing be initially somewhat misaligned. Subsequent to stabbing, the members to be joined are in alignment, and the coating on the exterior Nose portion 20 of the pin cannot come into contact with the bell 26 during the remainder of the joining process. Insertion is normally halted at the depth at which the pin and bell coatings overlap (See FIG. 2B), but a slight overrun in insertion depth can be tolerated without adverse consequences. As illustrated by FIG. 2B, the completed joint is seen to be "holiday free" in that the internal coatings 27 and 22 of the bell and pin overlap in such a manner that no bare metal is exposed on the interior portion of the joint. Additionally, the wiping action of the joining process insures that a wedge 30 of sealant occupies what otherwise would be the void between the coated inner portion of the bell member and the coated turned-down portion of the pin thereby providing additional protection against the subsequent development of "holidays" as well as providing a pressure seal.

A double seal is provided against internal pressure in the pipe by the wedge 30 and the sealant 31 contained within the groove 24. With respect to pressure external of the pipe, a double seal is provided by sealant wedge 32 between the flare 29 and pin 21 and by the sealant 31 in the groove 24.

The present invention as described for application to internally coated members provides several advantages over previous means for joining internally coated pipe. Heretofore, such coatings had to be flexible, tapered at the end on the inside of the bell, and coated on the edge of the pin end up to the outer surface of the pipe. The first requirement eliminated the many applications which required a harder but more brittle coating, and the latter two were extremely difficult if not impossible to achieve consistently. Additionally, extremely precise make up of the pipe ends was required (to within 1/64 of an inch). Even such precision on insertion depth did not always produce satisfactory results; the bevel dimension on the pin end could vary so much even within A.P.I. standards that the coating was frequently sheared off the bell during make up. Also, since there was almost no overlap of coating upon even successful joining, the single-thickness seal was not reliable and occasional holidays resulted.

With the joint of the present invention, the coating can be either flexible or brittle, there is no requirement for tapering inside the bell, and the difficult task of coating the edge of the pin end up to its outside diameter is eliminated. For the reasons explained earlier, the coating is not damaged during stabbing or makeup, and a substantially overlapping seal is easily effected. Additionally, considerably greater tolerance of makeup depth is obtained, thereby eliminating the need for precision control of insertion depth. An additional protection against holidays is provided by the substantial sealant wedge between nose and bell which always provides a coating-to-coating seal.

It has been found that the normal joining method allows the bell to expand to a degree which sometimes permits brittle interior coatings 25 to crack. This disadvantageous feature is eliminated by the use of exterior slips 50 designed to grip and contain the outside of the bell rather than the pipe behind the bell. When the bell slips are used, the bell is prevented from substantially deforming, outwardly, and such deformation as does occur is in compression of the pin member. Since such linings can withstand greater deformation in compression than in tension, the internal lining of the pin member does not crack during compression of the pin. As the pin member is compressed to accommodate the necessary deformation, the member becomes progressively stronger and provides greater resistance to compression. Thus it is possible for quite high inelastic stresses to be created in the pin member, which stresses, while high enough to expand the bell slightly upon its release from the slips, are not large enough to overcome the greater resistance of the pin member and be dissipated in further deformation of said pin member. The subsequent expansion of the bell, however, is always small enough so that its brittle lining does not break upon release of the bell slips.

The bell slips 50, of course, may be used in conjunction with any of the described joints, and are especially valuable in the prevention of splits in the bells of pipe of lesser quality.

Still another preferred embodiment permits the mechanical joining of externally-coated pipe or, upon combination with the joint as described immediately above, of pipe which is coated both internally and externally. To avoid marring or destroying the external coating, it is preferred to use external bell slips 51 coated with an elastomer 52 of lower durometer than the external coating. A particularly attractive advantage of this joint compared to those produced by conventional methods is that it permits the joining of externally-coated pipe without the necessity of a "field joint"; i.e., without the application of coating material to the exposed ends in the field after the completion of the joint.

Figure 3A:
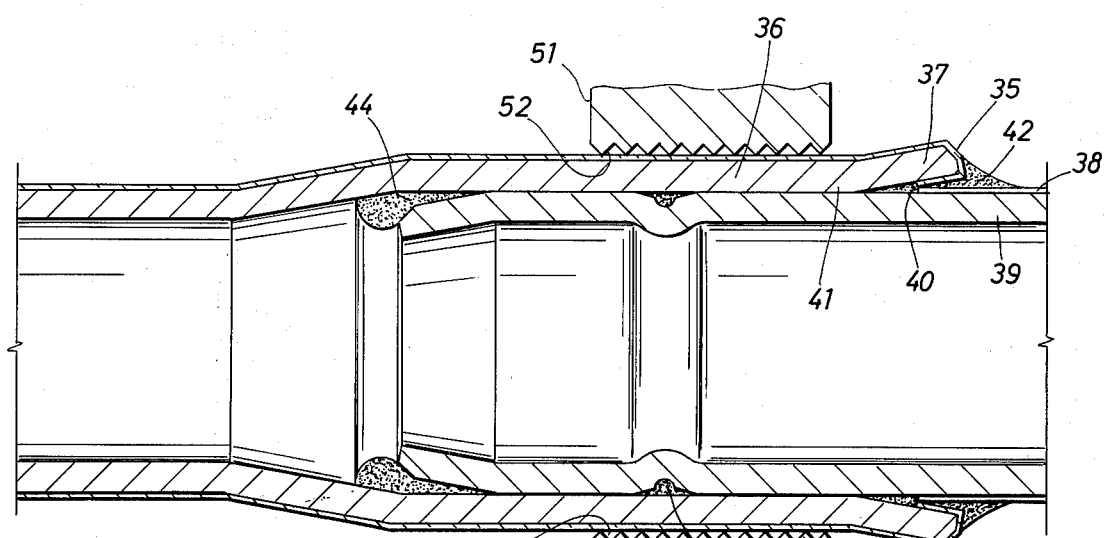
FIG. 3A similarly depicts the completed joint but illustrates a preferred arrangement for external coating.

Several variations of the externally-coated joint are possible. The joining procedure is essentially the same in all instances, the differences being primarily in the preparation of the ends prior to joining. In one, the external coating on the bell end is continued around the edge, down the inside of the flared portion of the bell, and into the straight portion of the bell for a short distance; the external coating on the pin end is not continued to the groove region but is terminated a short distance past the point of overlapping of bell and pin. In another, the external coating 35 on the bell is continued around the edge of the flared portion and terminated; the external coating on the pin continues up to the groove region. It still another, as illustrated in FIG. 3A, the external coating 35 on the bell 36 is continued around the edge of the flared portion 37 and down the inside of said flared portion, and terminated near the point of transition 40 from the flared portion of the bell to the essentially straight portion 41 of the bell. When the bell 36 is so coated, it is necessary that the pin 39 be coated only to a distance which will permit the exterior coating 38 of the pin to engage the extended exterior coating of the bell 36 upon make-up. Lubricating sealant 42—either conventional or of high film strength—is applied to the pin, from the edge to just past the groove 43, and in an amount which will insure filling of the void 44 between pin and bell caused by the turndown of the pin. Sealant 42 is also preferably applied to the internal portion of the bell, in a circumferential ring of about ½ inch to 1 inch in width, beginning at the point at which the flared portion of the bell changes into the straight portion. The joint may then be made up in the normal manner, during which the space between the flared portion and the pin becomes filled with sealant.

Figure 3B:
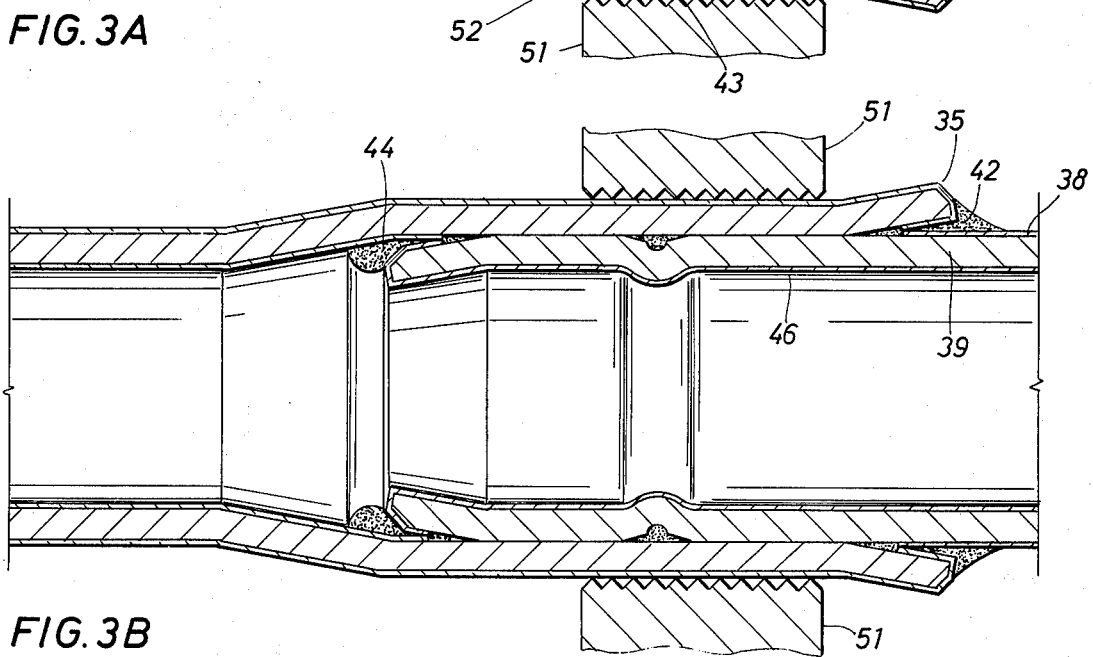
FIG. 3B illustrates a joint with both internal and external coating.

In FIG. 3B, the pin 39 is provided with an internal coating 46 which laps around the tapered end of the pin and extends to the outer diameter. Thus, a holiday free joint can be formed.

It will be recognized by those skilled in the art that two of the foregoing will provide a coating-to-coating seal when properly made up, and that the other will provide a coating-to-sealant-to-coating seal; it will also be recognized that overrunning or underrunning the nominal insertion depth will not leave an exposed area or "holiday" on the joint, the sealant occupying any voids between bell and pin and providing the necessary coverage. It will also be recognized that such joints as contain a grooved region will provide a double seal against internal pressure and at least a double seal against external pressure.

It will be apparent that the embodiments herein shown and described are exemplary only, and various modifications may be made in construction, materials and arrangement yet be within the scope of the invention as defined by the following claims:

I claim:

1. A method of joining interference fitted ends of tubular members wherein said members have a plastic coating on their interiors comprising
   forming an enlarged bell end on one of said tubular members together with an outwardly flared end, so as to receive another tubular member;
   coating the interior of the bell end into the section forming the enlarged bell end;
   forming an inwardly tapered end on another tubular member for reception into said bell end;
   coating the interior of the other tubular member as well as the end and the outer surface of the inwardly tapered end;
   forming an annular groove in the outer surface of said other tubular member at a location where the groove lies within the bell upon insertion of the tubular member into the bell end;
   applying an epoxy sealing member to said other member and inserting in interference fit said other member into said bell end until the coatings on the interior of the bell end and the exterior of outer surface are in close proximity.

2. The method as defined in claim 1 and further including during the inserting step the step of constraining the outside walls of the bell end so as to prevent their expansion during insertion of one tubular member into the other.

3. The method as defined in claim 1 and further including the step of providing a relief tapered surface on either side of said annular groove.

4. A method of joining interference fitted ends of tubular members wherein said members has a plastic coating on their interiors comprising
   forming an enlarged bell end on one of said tubular members together with an outwardly flared end so as to receive another tubular member;
   coating the exterior of the bell end as well as the interior of the outwardly flared end;
   forming an inwardly tapered end on another tubular member for reception into said bell end;
   coating the exterior of the other tubular member to a location where it will align with the exterior coating on the bell end when the ends are coupled together,
   forming an annular groove in the outer surface of said other tubular member at a location where the groove lies within the bell upon insertion of the tubular member into the bell end;
   applying an epoxy sealing member to said other member and inserting in interference fit said other member into said bell end until the coatings on the interior portion of the flared end of the bell and the exterior of outer surface are in close proximity.

5. The method as defined in claim 4 and further including during the inserting step the step of constraining the outside walls of the bell end so as to prevent their expansion during insertion of one tubular member into the other.

6. The method as defined in claim 4 and further including the step of providing a relief tapered surface on either side of said annular groove.

* * * * *